J. G. HOLICKY.
DIRIGIBLE AUTOMOBILE HEADLIGHT.
APPLICATION FILED JUNE 24, 1915.
1,154,863.
Patented Sept. 28, 1915.
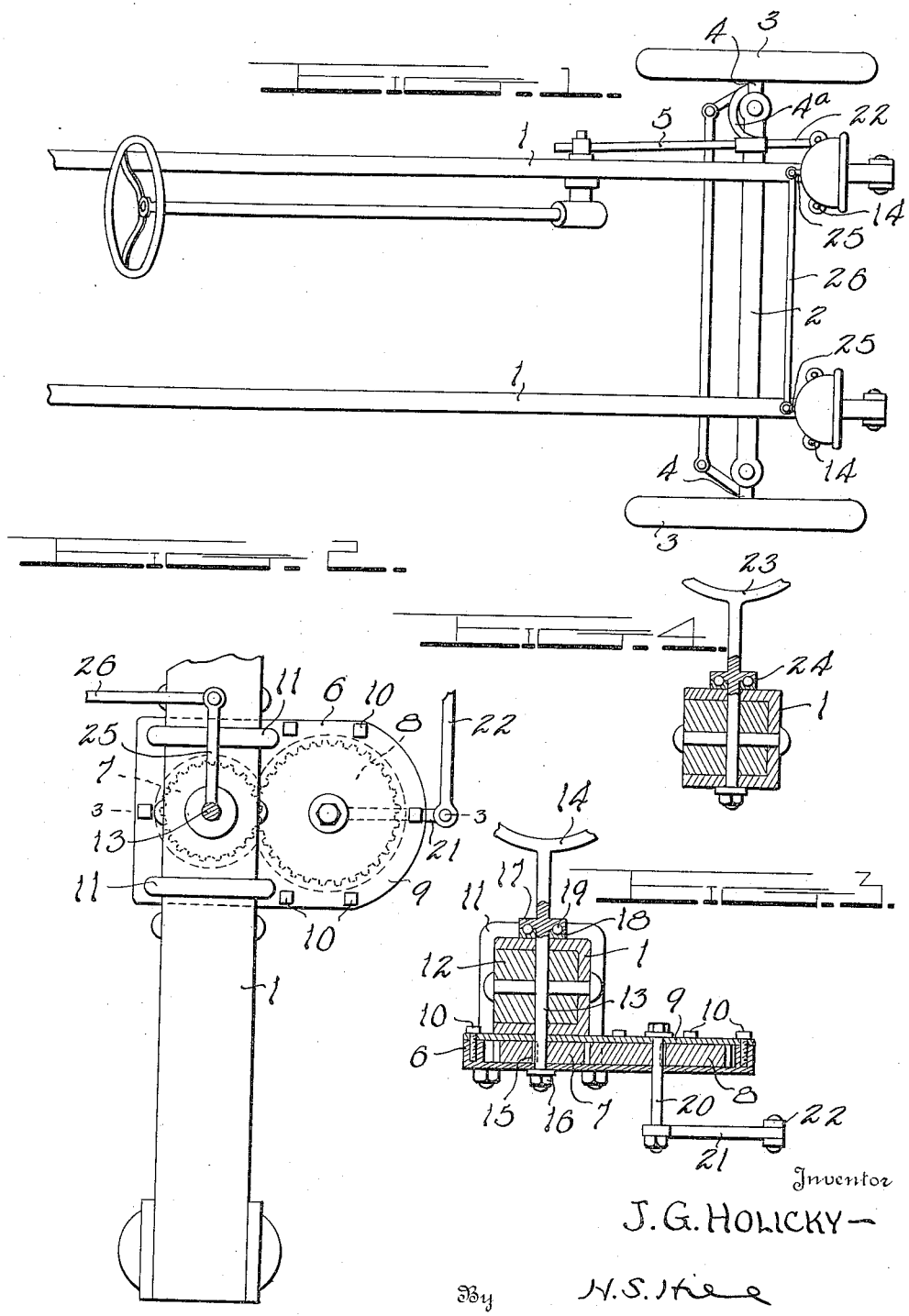
Inventor
J. G. HOLICKY
By H. S. Hire
Attorney

UNITED STATES PATENT OFFICE.

JOHN G. HOLICKY, OF WILLOUGHBY, OHIO.

DIRIGIBLE AUTOMOBILE-HEADLIGHT.

1,154,863.  Specification of Letters Patent.  Patented Sept. 28, 1915.

Application filed June 24, 1915. Serial No. 36,014.

*To all whom it may concern:*

Be it known that I, JOHN G. HOLICKY, a citizen of the United States, residing at Willoughby, in the county of Lake and State of Ohio, have invented certain new and useful Improvements in Dirigible Automobile-Headlights, of which the following is a specification.

The present invention relates to a dirigible headlight for automobiles, and has for its object to provide a device of that character which embodies novel features of construction whereby the headlight will turn the instant the steering wheel is turned and may be arranged to turn faster than the wheels so that the driver can see clearly where he is going and will not be in danger of running into a ditch or over an embankment before having an opportunity to see and avoid the same.

Further objects of the invention are to provide a device of this character which is comparatively simple and inexpensive in its construction, which can be readily mounted upon the frame of an automobile and connected to the steering gear without interfering with the action of the springs or the steering of the vehicle in the usual manner, which is entirely automatic in its action and requires no special attention on the part of the driver, and which is not liable to get broken or out of repair.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a top plan view of the front portion of an automobile chassis, showing the manner of connecting the lamps to the steering gear. Fig. 2 is an enlarged top plan view of that side of the frame to which the gear carrying casing is applied, showing the manner of securing the casing to the frame. Fig. 3 is a transverse sectional view taken on the line 3—3 of Fig. 2, and Fig. 4 is a similar view taken through the lamp bracket bearing on the opposite side of the frame.

Corresponding and like parts are referred to in the following description and indicated in all the views of the drawings by the same reference characters.

Specifically describing the present embodiment of the invention, the numerals 1 designate the end portions of the side bars of the main frame which are extended forwardly beyond the front axle 2 and have the springs connected thereto in the usual manner. The front wheels 3 are mounted upon the usual spindles 4 which are pivotally mounted upon the ends of the axle 2, one of the spindles being provided with the spindle arms 4ª which has the extremity thereof pivotally connected to the steering gear connecting rod 5. This is all of the conventional construction and no claim of novelty is based thereon.

Mounted upon the forwardly projecting end 1 of that side bar located adjacent the spindle 4 which is provided with the spindle arm 4ª is a casing 6 within which a pair of gear wheels 7 and 8 are mounted in such a manner as to mesh with each other. A suitable cover plate 9 may be removably applied to the top of the casing 6 and held in position by suitable fastening means such as the screws 10.

The casing 6 is arranged under the projecting end of the side bar 1 with the axis of the gear wheel 7 directly under the middle of the side bar and the portion of the casing containing the gear wheel 7 projecting laterally from the side bar in a direction toward the adjacent front wheel 3. A pair of clips or U bolts 11 may be provided for clamping the casing 6 in position upon the side bar, and where the side bars are formed of channel beams, filler blocks 12 would be fitted within the same so as to eliminate any possibility of the flanges of the channel bars being bent out of position. These filler blocks could be riveted or otherwise secured in position, and upon tightening the U bolts 11 the casing 6 would be held rigidly in position upon the side bar 1.

The stem 13 of the lamp bracket 14 passes loosely through a suitable opening drilled in the side bar 1 and block 12, and is keyed at 15 to the gear wheel 7, the lower end of the stem projecting below the casing 6 where it is capped by a nut 16. Roller bearings are preferably provided for the lamp bracket so that the movements thereof will never be accompanied by any binding action. For this purpose the portion of the stem 13 above the side bar 1 may be provided with a collar 17, and a bearing block 18 may be mounted upon the side bar 1 under the collar 17, the opposed faces of the collar and bearing block being formed with corresponding annular raceways adapted to receive a set of balls 19. This bearing may be tightened or loosened as required by manipulating the nut 16 in the proper manner.

Rigid with the gear wheel 8 and projecting downwardly from the casing 6 is a shaft 20 which is provided at its lower end with a crank arm 21, said crank arm being connected by a link 22 to the end of the steering gear connecting rod 5. With this construction it will be obvious that the back and forth movement of the connecting rod 5 which is incident to steering the vehicle will result in turning the gear wheel 8, said motion being transmitted through the gear wheel 7 to the lamp bracket 14. The gear wheel 8 is preferably made larger than the gear wheel 7 so that the gear wheel 7 will have a greater angular movement than the gear wheel 8. This causes the lamp to be very quickly turned, the movement of the lamp in fact being quicker than that of the wheels, so that the driver can see that side of the road toward which he is turning and avoid any danger which would not otherwise be seen by him. The opposite lamp bracket 23 is mounted upon the other side of the machine upon a suitable bearing 24 so as to be susceptible of turning about a vertical axis, and the two brackets 14 and 23 are provided with corresponding crank arms 25 having the extremities thereof connected by a link member 26 so that the two headlights will always turn in unison, the lamp bracket 14 being turned by reason of its connection to the steering gear, while the bracket 23 is rotated by reason of its connection with the bracket 14. The two headlights are thus mounted in such a manner that they both begin to turn the instant the steering wheel is turned, and by providing a suitable relation between the two gear wheels 7 and 8 the headlights may be caused to turn even faster than the wheels so as to illuminate the side of the road toward which the driver is turning and enable the driver to see and avoid any danger which would be invisible with the headlights facing toward the front of the car in the usual manner.

Having thus described the invention, what I claim as new and desire to secure by Letters Patent, is:—

1. A dirigible automobile headlight, including a casing, a pair of intermeshing gear wheels journaled within the casing, means for mounting the casing upon the lower side of a frame member of an automobile, a lamp bracket formed with a stem which passes loosely through the frame member and casing and is keyed to one of the gear wheels, a bearing block applied to the upper side of the frame member, a collar projecting from the stem and coöperating with the bearing block to provide a bearing for the support of the lamp, a nut fitted upon the lower end of the stem for adjusting the bearing, and an operative connection between the other gear wheel and the steering gear of the automobile.

2. A dirigible automatic headlight, including a casing having an open top, a removable cover plate for the casing, a pair of intermeshing gear wheels journaled within the casing, fastening members clamping the casing to the lower side of a frame member of an automobile and also serving to retain the cover plate in position, a bearing block on the upper side of the frame member, a lamp bracket formed with a stem which passes loosely through the frame member and casing and is keyed to one of the gear wheels, a collar upon the stem which coöperates with the before mentioned bearing block to provide a bearing for the lamp bracket, a nut applied to the end of the stem for adjusting the bearing, and an operative connection between the opposite gear wheel and the steering gear of the automobile.

3. A dirigible automobile headlight, including a casing, a small gear wheel journaled within the casing, a large gear wheel journaled within the casing and meshing with the small gear wheel, means for mounting the casing upon one side of a frame member of the automobile, a lamp bracket formed with a stem which passes loosely through the frame member and the casing, said stem also extending axially through the small gear wheel and being keyed thereto, a ball bearing for the same arranged upon the opposite side of the frame member, a nut applied to the end of the stem for adjusting the ball bearing, and an operative connection between the large gear wheel and the steering gear of the automobile, the ratio between the large gear wheel and the small gear wheel causing the lamp to turn more quickly than the vehicle wheels.

In testimony whereof I affix my signature in the presence of two witnesses.

JOHN G. HOLICKY.

Witnesses:
H. S. GARMAN,
S. LOW.

Copies of this patent may be obtained for five cents each, by addressing the "Commissioner of Patents, Washington, D. C."